United States Patent
Mock (10) Patent No.: US 7,520,192 B2
(45) Date of Patent: Apr. 21, 2009

(54) REDUCED-FRICTION DRIVE SCREW ASSEMBLY

(75) Inventor: M. Robert Mock, Moorpark, CA (US)

(73) Assignee: HR Textron, Inc., Santa Clarita, CA (US)

( * ) Notice: Subject to any disclaimer, the term of this patent is extended or adjusted under 35 U.S.C. 154(b) by 806 days.

(21) Appl. No.: 10/991,882

(22) Filed: Nov. 18, 2004

(65) Prior Publication Data

US 2006/0101930 A1    May 18, 2006

(51) Int. Cl.
    F16H 25/22    (2006.01)
(52) U.S. Cl. .................................. 74/89.34; 74/89.36
(58) Field of Classification Search ............... 74/89.23, 74/89.34, 89.36, 89.37
    See application file for complete search history.

(56) References Cited

U.S. PATENT DOCUMENTS

| | | | |
|---|---|---|---|
| 5,784,922 A * | 7/1998 | Ozaki et al. ................ | 74/89.37 |
| 6,307,285 B1 | 10/2001 | Delson et al. | |
| 6,791,215 B2 | 9/2004 | Tesar | |
| 6,927,513 B2 | 8/2005 | Schreier | |
| 7,095,193 B2 | 8/2006 | Kellogg et al. | |
| 7,098,619 B2 | 8/2006 | Stridsberg | |
| 7,109,679 B2 | 9/2006 | Edson et al. | |
| 7,116,100 B1 | 10/2006 | Mock et al. | |
| 7,259,551 B2 | 8/2007 | Mock et al. | |

* cited by examiner

Primary Examiner—William C Joyce
(74) Attorney, Agent, or Firm—BainwoodHuang (57) ABSTRACT

Methods and apparatus are disclosed for providing reduced friction in drive screw assemblies, including electromechanical actuator (EMA) assemblies. A drive screw assembly is disclosed that includes a drive shaft, a drive screw, and a screw head. A stationary guide collar having a guide bore and a support surface receives the screw head or a portion of the drive screw. The guide collar may be fixed in angular relation to the screw head. As the screw head moves on a linear path during rotation of an associated drive shaft, a supported surface slides in only linear motion with respect to the support surface of the guide collar and as a result friction forces due only to linear motion are generated. Rotational friction forces and associated efficiency and power losses are consequently reduced or eliminated in the drive screw assembly. The supported surface may include a perimeter of the screw head, a circumferential surface of the second portion of the drive screw, or a circumferential surface of an intermediary screw shank.

28 Claims, 4 Drawing Sheets

REDUCED-FRICTION DRIVE SCREW ASSEMBLY

BACKGROUND

Drive screw assemblies or drive screws are used in many applications to convert angular or rotary motion, typically from a motor, into controlled linear or rotary motion of a mechanical part or machine element. A drive screw assembly typically includes a drive shaft with a female threaded portion that is coupled to the male threaded portion of a drive screw so that the drive shaft and drive screw are connected by intermeshing threads. The threaded portion of the drive screw is coupled to a screw head. As the drive shaft is rotated by a power source, the threaded portion of the drive screw moves the rest of the drive screw in proportional translation relative to the drive shaft. The screw head is consequently extended or retracted along a linear path relative to the drive shaft.

One application of drive screw assemblies is in electromechanical actuators (EMAs). EMAs convert electrical signals into mechanical displacements, and are widely used for many applications. An EMA is typically driven by an electric motor that receives control signals from an EMA controller. The EMA electric motor has a motor shaft that is mechanically coupled to the drive shaft of the associated drive screw assembly. Alternately, the drive shaft of the EMA can be coupled to a secondary drive component, e.g., a gear, that is driven by the motor shaft. For position monitoring and/or control, a position feedback signal may be provided to the EMA controller. Examples of applications in which EMAs are used include the control or actuation of flight control surfaces in aircraft and the control or actuation of fluid flow control devices for hydraulic and pneumatic applications.

Figure 1:
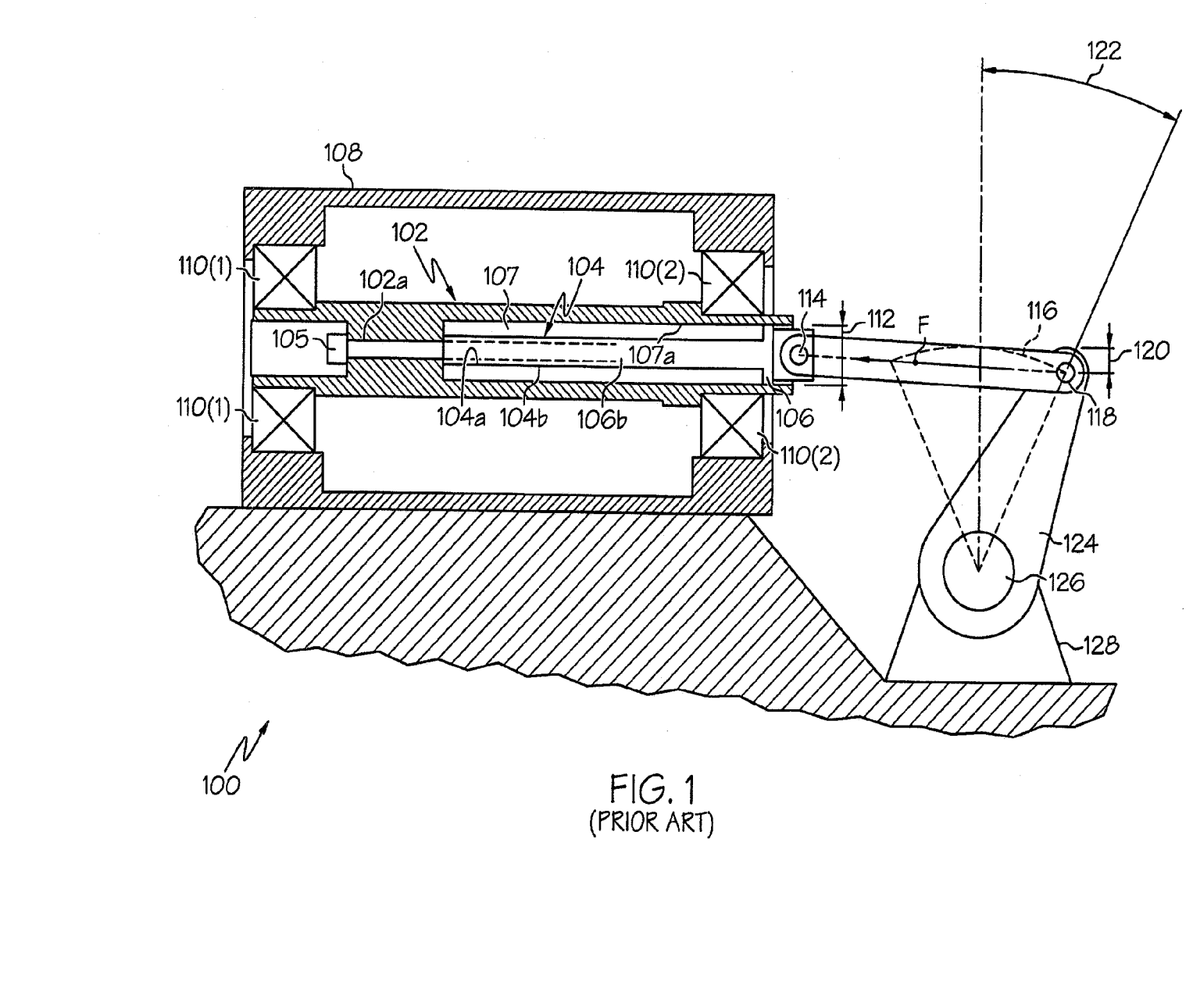
FIG. 1 is a cross sectional view of a prior art drive screw assembly.

FIG. 1 shows a typical prior art drive screw assembly 100 as used in a typical EMA application. The drive screw assembly 100 includes a drive shaft 102, a drive screw 104, and a screw head 106 within a housing 108. The drive shaft 102 has a drive shaft bore 107 with an inner bore surface 107a. The drive screw 104 includes a male threaded portion 104a that is connected by intermeshing threads to the female threaded portion of the drive shaft 102a. The threaded portion 104a of the drive screw 104 does not rotate in unison with, the drive shaft 102. The screw head 106 has a screw head perimeter 106a that is surrounded by the inner bore surface 107a, as shown. The screw head 106 may also have an intermediary portion 106b, e.g., a screw shank, connected to the screw head 106. The drive shaft 102 is positioned within a housing 114 and held by bearings 110(1)-(2), which allow rotational movement of the drive shaft 102. The drive shaft 102 rotates relative to the drive screw 104, the screw head 106 and relative to the housing 114.

As the drive shaft 102 rotates, e.g., when rotated by an electric motor (not shown), the threaded connection between the drive screw 104 and screw head 106 causes the screw head 106 and screw head perimeter 106a to undergo translational movement along the drive shaft bore 107 as the inner bore surface 107a simultaneously rotates around the screw head perimeter 106a. The translational movement of the screw head 106 can be used to move any desired machine or structural element that is connected, directly or indirectly, to the screw head 106. For example, the screw head 106 may be attached to a drag link 116 that is attached to a crankshaft 126, as shown. A suitable crankshaft 124 may have any desired shape, e.g., number and configuration of crank arms, and anchoring or bearing configuration, e.g., it may be connected with bearings to a support 128. A suitable drag link 116 can be connected to the screw head 106 and the crankshaft 124 by pivot connections, 114, 118, respectively, which may include, for example, pivot pins.

One problem that exists with current prior art drive screws including EMAs, such as 100, is the significant efficiency reduction, and corresponding power loss, due to friction forces acting between the screw head 106 and the adjacent rotating parts, e.g., drive shaft inner bore surface 107a. During operation of the prior art drive screw 100, as the screw head 106 is extended or retracted within the drive shaft bore 107 by the rotating motion of the drive shaft 102, the screw head perimeter 106a slides both in linear motion and rotational motion, with respect to the inner bore surface 107a. The sliding movement of the screw head perimeter 106 against the rotating inner bore surface 107a can produce substantial friction forces, which in turn produce power and efficiency losses. The friction forces on the screw head 106 can be increased, making power loss in the screw assembly 100 worse, when side loads, normal to the drive shaft bore 107, are present at the screw head 106. Side loads can result from the geometry of any associated mechanical linkage attached to the screw head, e.g., the drag link skew angle 120, which as used herein represents the degree of position out of parallel, with respect to the drive shaft bore 107. The drag link skew angle 120 may be influenced by the position and geometry of the drag link 116 and its connection to any other elements, e.g., crank arm 124, and pivot angle 122.

As is evident from the description of prior art drive screw assemblies above, friction losses have a significant impact on the efficiency of drive screws, including EMAs. What are needed therefore are methods and apparatus to reduce friction losses and thereby increase the efficiency of drive screws, including those used in EMAs.

SUMMARY

Embodiments of the present invention are directed to methods and apparatus that address the limitations described above for the prior art by employing a fixed guide collar to reduce or eliminate rotational friction at a screw head of a drive screw. Embodiments may be used in EMA or screw-driven power train applications.

One embodiment of a drive screw assembly according to the present invention includes a drive screw assembly that includes a drive shaft having a drive shaft bore disposed within a housing having an outer opening connected to the drive shaft bore. The drive shaft includes a longitudinal axis, and the drive shaft is free to rotate within the housing. A drive screw is disposed within the drive shaft bore. The drive shaft has a female threaded portion and the drive screw has a male threaded portion that are configured to receive one another in a threaded connection and to rotate with respect to one another about the longitudinal axis. A guide collar fixed relative to the housing. The guide collar has a guide bore with an inner support surface. The inner support surface has an inner support surface length, and is connected to an outer surface of the guide collar by an inner guide bore opening and an outer guide bore opening. A screw head is affixed to the threaded portion of the drive screw. The screw head is fixed in angular relation to guide collar, and is moveable along a range from a first position to a second position on a range axis that is parallel to the longitudinal axis of the drive screw. The inner support surface of the guide collar supports a supported surface of the screw head or the drive screw, e.g., a screw shank, in directions normal to the range axis as the screw head moves through the range. The supported surface slides in linear motion relative to the guide collar without substantial rotational motion and without producing substantial frictional losses due to rotational motion as the screw head moves through the range.

The drive screw assembly may include one or more bearings disposed within the housing and connected to the drive shaft to support the drive shaft for rotational motion. The guide collar may be rigidly connected to the first housing. The drive shaft has first and second ends, and the one or more bearings may include first and second bearings disposed at the first and second ends of the drive shaft. The drive screw assembly may further include a machine element connected to the screw head. The machine element may include a drag link pivotally connected to the screw head. The inner guide bore opening and outer guide bore openings may be concentric with the housing outer opening. The guide collar may include an extension sleeve that is disposed within a portion of the drive shaft bore. The supported surface may include the screw head perimeter. The supported surface may include a circumferential surface of a screw shank. The collar bore may be defined by a second housing, and the inner opening of the guide collar bore may be located a desired distance from the outer opening of the drive shaft bore. The drag link may be connected to the screw head by a link pin. The link pin may have first and second extending ends that extend from the screw head. The first and second extending ends may be guided in respective first and seconds slots formed in the inner support surface of the guide collar. The guide collar may include any desired cross section, e.g., round, square, elliptical, polygonal, etc., along the guide bore.

Another embodiment includes an electromechanical actuator (EMA) that includes a drive shaft having a drive shaft bore disposed within a housing having an outer opening connected to the drive shaft bore. The drive shaft includes a longitudinal axis, and the drive shaft is free to rotate within the housing. A drive screw is disposed within the drive shaft bore. The drive shaft has a female threaded portion and the drive screw has a male threaded portion to receive one another in a threaded connection and to rotate with respect to one another about the longitudinal axis. A guide collar fixed relative to the housing. The guide collar has a guide bore with an inner support surface. The inner support surface has an inner support surface length, and is connected to an outer surface of the guide collar by an inner guide bore opening and an outer guide bore opening. A screw head is affixed to the threaded portion of the drive screw. The screw head is fixed in angular relation to guide collar, and is moveable along a range from a first position to a second position on a range axis that is parallel to the longitudinal axis of the drive screw. The inner support surface of the guide collar supports a supported surface of the screw head or the drive screw, e.g., a screw shank, in directions normal to the range axis as the screw head moves through the range. The supported surface slides in linear motion relative to the guide collar without substantial rotational motion and without producing substantial frictional losses due to rotational motion as the screw head moves through the range.

The EMA may include one or more bearings disposed within the housing and connected to the drive shaft to support the drive shaft for rotational motion. The guide collar may be rigidly connected to the first housing. The drive shaft has first and second ends, and the one or more bearings may include first and second bearings disposed at the first and second ends of the drive shaft. The EMA may further include a machine element connected to the screw head. The machine element may include a drag link pivotally connected to the screw head. The inner guide bore opening and outer guide bore openings may be concentric with the housing outer opening. The guide collar may include an extension sleeve that is disposed within a portion of the drive shaft bore. The supported surface may include the screw head perimeter. The supported surface may include a circumferential surface of a screw shank. The collar bore may be defined by a second housing, and the inner opening of the guide collar bore may be located a desired distance from the outer opening of the drive shaft bore. The drag link may be connected to the screw head by a link pin. The link pin may have first and second extending ends that extend from the screw head. The first and second extending ends may be guided in respective first and seconds slots formed in the inner support surface of the guide collar. The guide collar may include any desired cross section, e.g., round, square, elliptical, polygonal, etc., along the guide bore.

BRIEF DESCRIPTION OF DRAWINGS

These and other features, aspects, and advantages of the present invention will become better understood with regard to the following description, appended claims, and accompanying drawings. The drawings are not necessarily to scale, emphasis instead being placed on illustration of principles of the invention. The drawings include the following figures:

DETAILED DESCRIPTION

The present invention may be understood by the following detailed description, which should be read in conjunction with the attached drawings. The following detailed description of certain embodiments is by way of example only and is not meant to limit the scope of the present invention.

Embodiments of the present invention are directed to methods and apparatus for reducing or eliminating rotational friction losses in drive screw mechanisms and the resulting efficiency reduction and associated power losses. A stationary guide collar having a guide bore with a support surface may be used to receive a screw head in a drive screw assembly. The guide collar is fixed in angular relation to the screw head. As the screw head moves on a linear path during rotation of an associated drive shaft, the screw head moves in only linear motion with respect to the support surface of the guide collar. As a result, the only friction forces generated are those due to linear motion. Rotational friction forces, and the associated power losses, are consequently reduced or eliminated in the drive screw assembly.

Figure 2:
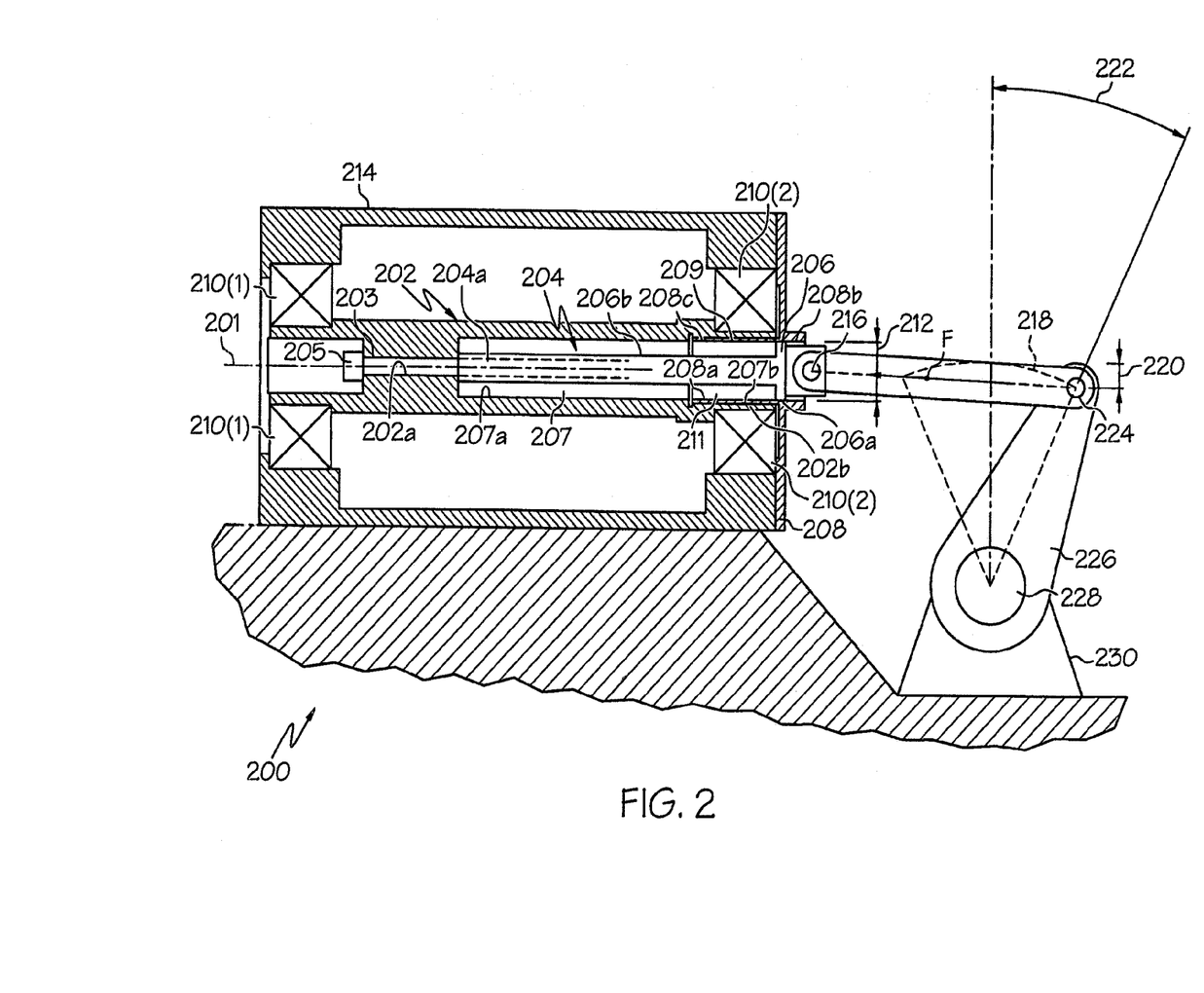
FIG. 2 is a cross sectional view of a drive screw assembly according to one embodiment of the present invention.

FIG. 2 shows a cross sectional view of a drive screw assembly 200 according to one embodiment of the present invention. The drive screw assembly 200 includes a threaded drive shaft 202, a threaded drive screw 204, and a screw head 206 that is received by a stationary guide collar 208. The drive shaft has a drive shaft bore 207 defined by a bore surface 207a. The drive screw 204 is located within and aligned along the longitudinal axis 201 of the drive shaft bore 207. The drive screw 204 has a male threaded portion 204a and the female threaded portion 202a of the drive shaft 202 that receive one another, for example, in a male and female intermeshed thread configuration. In certain embodiments, the threaded portion 204a of the drive screw 204 may be threaded and mated into a threaded portion 202a of the drive shaft 202. The screw head 206 has a desired diameter 212 and is integral with or affixed to the threaded portion 204b of the drive screw 204. The screw head 206 has a screw head perimeter 206a. The screw head 206 may have an intermediary screw shank 206b, e.g., a shaft, with or without threads, to facilitate positioning of the screw head perimeter 206a. The drive shaft 202 is supported by bearings 210(1)-(2) that allow the drive shaft 202 to rotate along its longitudinal axis 201 within a housing 214.

The screw head 206 is moveable along a linear path having a range from a first position to a second position along a longitudinal axis 201 of the drive shaft bore 207. The guide collar 208 is mounted to the housing 214 and receives the screw head 206 with a support surface 208a that is of sufficient length to accommodate the movement of the screw head 206. The guide collar 208 includes first and second openings 208b, 208c defining a guide bore 211 of a desired diameter 212 sufficient to allow movement of the screw head 206 within the guide bore 211. The guide collar 208 does not rotate as the screw head 206 moves in linear motion within the drive shaft bore 207 due to the turning of the drive shaft 202. The support surface 208a supports a supported surface of the screw head, e.g., the screw head perimeter 206a, in directions normal to the longitudinal axis 201 of the drive shaft 202 as the screw head 206 moves in translation along its range of movement. The guide collar 208 functions to guide and support the screw head 206 with a non-rotating support surface 208a, thus eliminating losses due to rotational movement. The guide collar 208 may be made of any suitable material, including, but not limited to, metals, plastics, and composites.

In some applications, the range of motion of the screw head 206 may include, or extend into, a portion of the drive shaft bore 207. In these applications, the guide collar 208 may have an extension sleeve 209 of a suitable thickness that fits within the drive shaft bore 207. The support surface 208a may be located in the extension sleeve 209. The drive shaft inner bore surface 207a may have one or more sections 207b with different diameters to accommodate the extension sleeve 209 of the guide collar 208 within the drive shaft 202.

As further shown in FIG. 2, the screw head 206 may be attached to any desired mechanical component, e.g., a drag link 218 that is attached to a crank arm 226 of a crankshaft 228. Such a drag link 218 may be connected to the screw head 206 and the crankshaft 226 by pivot connections, 224, 216, respectively, which, in certain embodiments, may be pivot pins. The crankshaft 228 is anchored by a support 230. A drag link skew angle 220 for the drag link 218 is dependent on the position and geometry of the drag link 218 and its connection to any other elements, e.g., crank arm 226, and pivot angle 222.

In operation of the drive screw assembly 200, the drive shaft 202 is rotated by a suitable motive force. The rotation of the threaded portion 202a of the drive shaft 202 causes the threaded portion 204a of the drive screw 204 to undergo proportional translational motion along the longitudinal axis 201 of the drive shaft bore 207 due to the threaded connection between the threaded portion 202a of the drive shaft and the threaded portion 204a of the drive screw 204. Because the threaded portion 204a of the drive screw 204 is affixed to, e.g., part of, the screw head 206, the screw head 206 consequently undergoes translational motion along the guide collar support surface 208a, along a range of motion parallel to the longitudinal axis 201 of the drive shaft bore 207. Because the guide collar 208 does not rotate relative to the screw head 206, rotational friction forces are not produced between the screw head perimeter 206a and the support surface 208a of the guide collar 208 during operation of the drive screw assembly 200. The resulting elimination of rotational friction losses increases the efficiency of the drive screw assembly 200. It should be understood that the drive shaft 202 may be rotated by any suitable means. In certain embodiments, a motor (not shown) may be adjacent, e.g., placed laterally, placed in-line, etc., to the housing 214 containing the drive shaft 202. In other embodiments, a motor may be contained within the housing 214 containing the drive shaft 202. Any suitable motor, e.g., electric, pneumatic, etc., may be used to rotate the drive shaft 202.

The screw head 206 may be attached to any desired machine element or machine part. For example, as shown, the screw head may be attached to the drag link 218 by pivot connection 216 as shown. The drag link 218 may be connected, e.g., by a pivot connection, to a crank arm 226 of a crankshaft 228 which may be connected, directly or indirectly, to and move a desired object, e.g., an aileron, a butterfly valve, etc. The drive screw assembly 200 may accordingly be used to efficiently move or actuate any desired machine element, such as by non-limiting example, a flight control surface or a fluid flow control device/surface.

Figure 3:
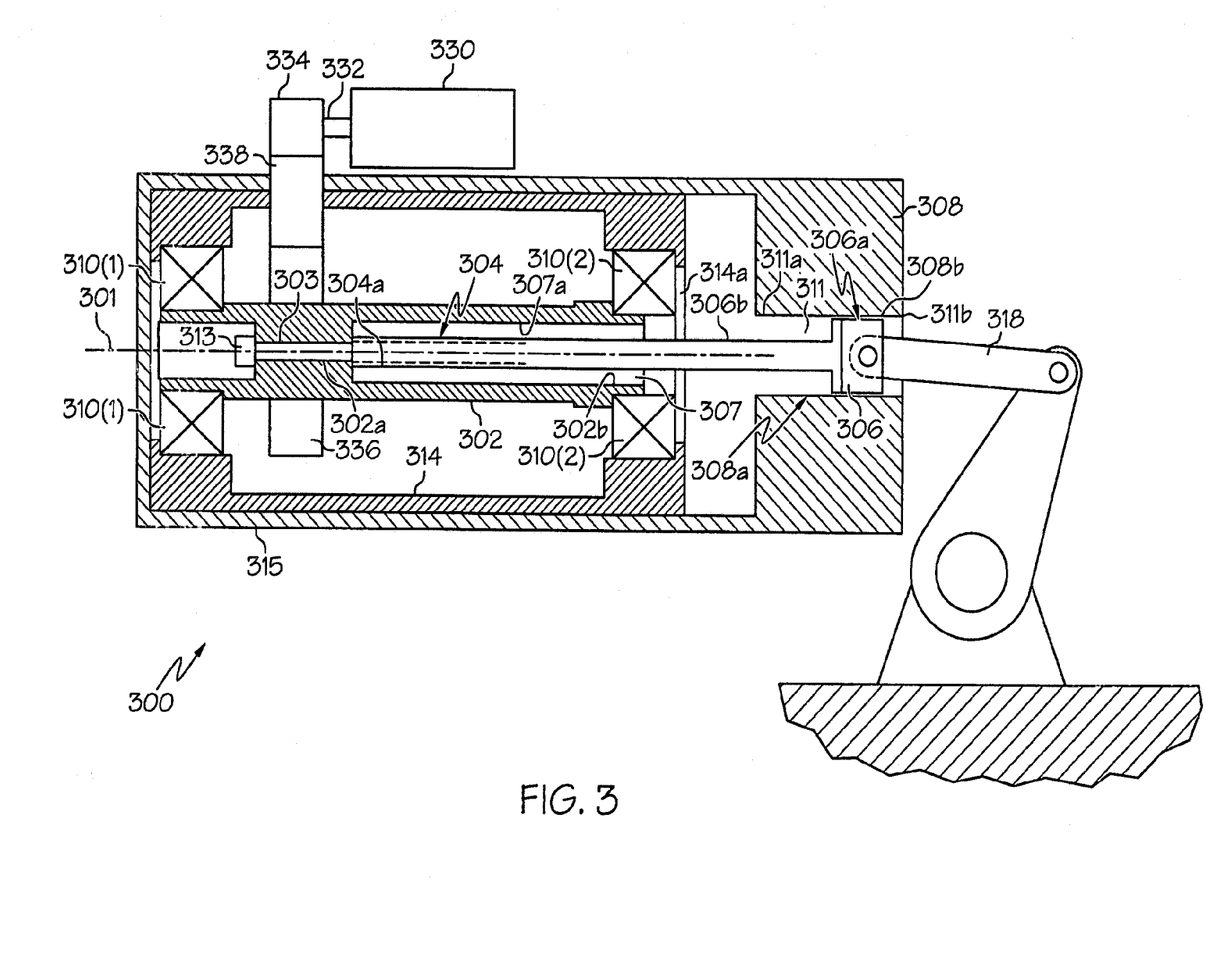
FIG. 3 is cross sectional view of another embodiment of the present invention.

In certain embodiments, e.g., an EMA, a guide collar used with a drive screw assembly may be remote, and placed at a desired location a distance away, from an associated drive shaft of the drive screw assembly. FIG. 3 is cross sectional view of an alternate embodiment that includes an EMA 300 having a guide collar 308 that is positioned a desired distance from a drive shaft 302 of the EMA 300. In addition to the drive shaft 302, the EMA 300 includes a threaded drive screw 304 and a screw head 306 that is received by the stationary guide collar 308. The drive shaft 302 is disposed within a first housing 314 and is supported by bushings or bearings 310(1)-(2) that allow rotation of the drive shaft 302. The drive shaft 302 has a longitudinal axis 301 and a drive shaft bore 307 with an inner bore surface 307a. The drive screw 304 has a threaded portion 304a that is mated to the drive shaft 302 by engagement with a threaded portion 302a of the drive shaft 302. The drive screw 304 is affixed to the screw head 306.

With continued reference to FIG. 3, the guide collar 308 may be part of or formed in a second housing 315 that defines a guide bore 311 and support surface 308a, as shown. The guide bore 311 is parallel to the longitudinal axis 301 of drive shaft 302. In certain embodiments, the guide bore is concentric, or coaxial, with the longitudinal axis 301 of the drive shaft 302. The guide bore 311 has an opening 311a into the interior of the second housing 315 to allow movement of the screw head 306. The guide bore 311 also had an opening 311b to the exterior of the second housing 315 to allow movement of the screw head 306, screw shank 306b, and/or drag link 318 within the guide bore 311. The second housing 315 may contain, or surround, the first housing 314 in certain embodiments, though this is not necessary. Alternately, the guide collar 308 and/or second housing 315 may be separate from any structure, e.g., first housing 314, supporting the drive shaft 302, with the guide collar fixed in angular relation to the first housing 314 about the longitudinal axis 301.

As shown in FIG. 3, the screw head 306, and possibly a portion of the drive screw 304, can extend from the drive shaft bore 307 and through an opening 302b at one end of the drive shaft 302 and an aligned opening 314a in the first housing 314. The screw head 306 may be configured as desired to facilitate positioning of the screw head 306 away from the drive shaft 302 and the first housing 314. For example, the screw head 306 may include a screw shank 306b between the threaded portion 304a of the drive screw 304 and the screw head perimeter 306a, as shown. The screw shank 306b may have any desired shape, e.g., straight, offset, etc., such that the affixed screw head 306 moves parallel to the longitudinal axis 301 as the drive shaft rotates.

FIG. 3 also shows an example of a power device, or prime mover, used to drive the drive shaft 302 of the EMA 300. A motor 330 is positioned adjacent to the drive shaft housing 314 and drives the drive shaft 302 by an output shaft 332 and output gear 334. One or more intermediary gears, e.g., gear 338, may connect the motor 330 to an input gear 336 on the drive shaft 302 as shown. The motor 330 may be positioned in any desired location relative to the drive shaft 302. For example, the motor 330 may be adjacent, e.g., placed laterally as shown, placed in-line, etc., to the housing 314 containing the drive shaft 302. In certain embodiments, the motor 330 may be concentric with the drive shaft 302, e.g. placed surrounding the drive shaft 302 and contained in the first housing 314. Any suitable electric motor, e.g., a brushless DC motor, may be used for the motor 330.

In operation of the EMA 300, rotation of the coupled drive shaft 302 causes proportional translation of the drive screw portion 304b, because of the threaded connection between the drive shaft threaded portion 302a and drive screw threaded portion 304a. Because the threaded portion 304a is fixed to the screw head 306, the screw head 306 consequently undergoes translational motion within the guide bore 311 of the guide collar 308.

Figures 4, 5:
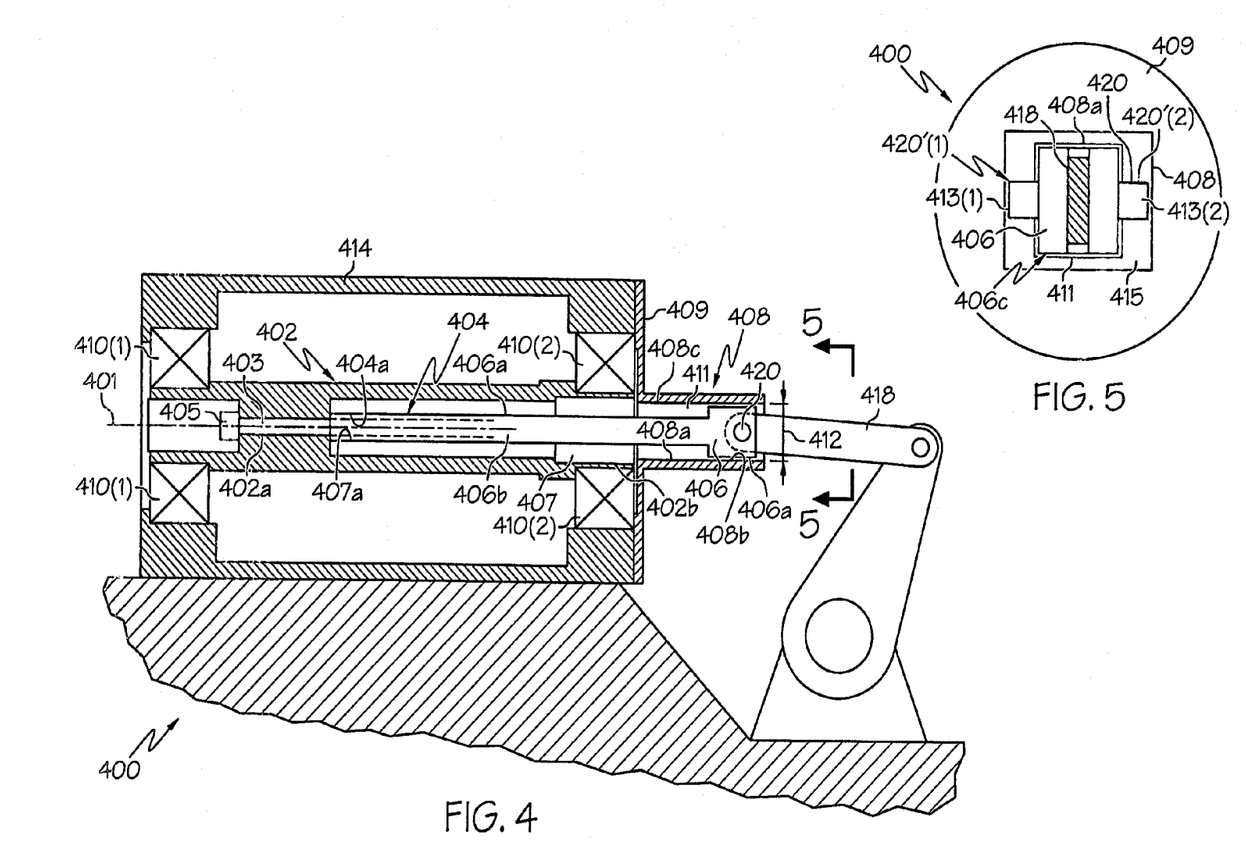
FIG. 4 is a cross sectional view of an alternate embodiment.
FIG. 5 is a sectional view of the embodiment of FIG. 4 taken along cutting plane 5-5.

FIG. 4 is a cross sectional view of an alternate embodiment of a drive screw assembly 400 in which a link pin 420 is guided in a slot in a guide collar 408. The link pin 420 connects a screw head 406 to a drag link 418. The link pin 420 has ends that extend beyond the screw head 406 that are guided in slots (shown in FIG. 5) in the stationary guide collar 408. The drive screw assembly 400 includes a drive shaft 402 with a threaded drive screw 404. The drive screw assembly 400 also includes the screw head 406, which is received by a stationary guide collar 408. The screw head 406 is affixed to a threaded portion 404a of the drive screw 404. The screw head 406 includes a screw head perimeter 406a. The screw head 406 may have an intermediary portion 406b, e.g., a screw shank, with or without threads, to facilitate positioning of the screw head perimeter 406a. The drive shaft 402 is supported by bearings 410(1)-(2) that allow the drive shaft 402 to rotate along its longitudinal axis 401 within a housing 414. The drive screw 404 is located within a drive shaft bore 407 that has an inner bore surface 407a. The drive screw 404 is, in certain embodiments, mated to the drive shaft 402 by the engagement of the threads of the drive screw 404a to drive shaft threads 402a.

The guide collar 408 is mounted to, or is an integral part of, the housing 414. The guide collar 408 may be made of any suitable material, including, but not limited to, metals, plastics, and composites. The guide collar 408 includes a support surface 408a that functions to support a supported surface of the screw head 406 or drive screw shank 406b. The guide collar 408 also includes first and second openings 408b, 408c defining a guide bore 411 of a desired cross section, as represented by the height 412 shown in FIG. 4. The guide collar 408 may be attached to, or integral with, a mounting plate 409 for attachment to the housing 414 containing the drive shaft 402.

In operation of the assembly 400, rotation of the coupled drive shaft 402 causes proportional translation of the threaded drive screw portion 404a, because of the threaded connection between the threaded portion 402a of the drive screw 402 and the threaded portion 404a of the drive screw 404. The threaded portion 404a is fixed to the screw head 406, and both components undergo translational motion in tandem within the guide bore 411 as the drive shaft 402 rotates. The guide collar 408 does not rotate as the screw head 406 moves in linear motion within the guide bore 411. The support surface 408a supports the supported surface, e.g. the screw head perimeter 406a, in directions normal to the longitudinal axis 401 of the drive shaft 402 as the screw head 406 moves along its range of movement. The guide collar 408 functions to guide and support the end of the screw head 406 with a non-rotating support surface 408a, thus eliminating friction losses due to rotational movement. The geometry of the cross section of the guide collar 408 may be selected as desired. One example of the geometry of a guide collar cross section along the longitudinal axis of the drive shaft 402 is described as follows for FIG. 5.

FIG. 5 is a sectional view of the embodiment 400 of FIG. 4 taken along cutting plane 5-5. The guide collar 408 includes the guide bore 411 and support surface 408a. The guide collar 408 has a cross section of 415 of a desired shape, e.g., square along or collinear with a longitudinal axis 401 of the drive shaft 402 (in FIG. 4). While a square cross section 415 is shown, the guide collar 408 may have a cross section 415 of any suitable shape, for example, the guide cross section 415 can be round, hexagonal, elliptical (see dashed lines in FIG. 5), polygonal, etc. The guide collar 408 may be centered relative to the mounting plate 409, as shown. In certain embodiments, the guide collar 408 may be positioned away from the center of the mounting plate 409. Further, in certain embodiments, the guide collar 408 and the screw head 406 may be positioned away from the longitudinal axis 401 of the drive shaft so that the screw head range of motion is parallel to but not collinear with the longitudinal axis 401. Such configurations may include the use of an offset screw shank 406b with two parallel portions jointing the screw head 406 to the drive screw threaded portion 404a.

As shown in FIG. 5, extending ends 420'(1)-(2) of the link pin 420 are guided in slots 413(1)-(2) formed in the inner support surface 408a of the stationary guide collar 408. The extending ends 420'(1)-(2) of the link pin may provide additional load-bearing surface(s) between the drag link 418 and the perimeter 406a of the screw head 406 and/or the guide collar 408. This configuration may consequently provide additional structure support for the drag link 418 in certain embodiments.

Accordingly, embodiments of the present invention may offer advantages over the prior art. For example, by use of the present invention, efficiency reductions due to rotational motion may be reduced or eliminated for drive screw applications, including EMAs. Embodiments offer design flexibility and the geometry of drive screw assemblies can vary greatly within the scope of the present invention. For example, a guide collar may be internal to a drive shaft or external to the drive shaft, e.g., beyond the drive shafts end. A guide collar according to the present invention may be retrofitted to an existing drive screw. In certain embodiments, a guide collar may be retrofitted to an existing EMA. A drive shaft of an existing drive screw may be adapted to receive a guide collar.

Embodiments may accordingly be used to efficiently move or actuate desired machine elements. By non-limiting example, embodiments of the present invention may be used to control flight control surfaces, e.g., fins, ailerons, swashplates, etc. Certain embodiments may be used in pneumatic or hydraulic applications, for example to regulate or control volumetric flow through a globe valve, a butterfly valve, hybrid valve, etc.

Although certain embodiments of the present invention have been described, other versions are possible. For example, while embodiments have been described as having a connection to a crank arm that rotates a crank, a screw head may be connected to any desired element to impart linear and/or rotational motion. Moreover, while the thread type for the drive screw has not been described with particularity, any suitable type may be used. For example, suitable thread types may include, but are not limited to, standard threads such as Unified, Acme, etc., and also special threads, e.g., multiple start threads. Furthermore, a ball screw or roller screw may be used for the drive screw within the scope of the present invention.

While the present invention has been particularly shown and described with references to preferred embodiments thereof, it will be understood by those skilled in the art that various changes in form and details may be made therein without departing from the spirit and scope of the invention as defined by the appended claims. The reader's attention is directed to all papers and documents that are filed concurrently with this specification and which are open to public inspection with this specification, and the contents of all such papers and documents are incorporated herein by reference. All the features disclosed in this specification, including any accompanying claims, abstract, and drawings, may be replaced by alternative features serving the same, equivalent or similar purpose, unless expressly stated otherwise.

What is claimed is:

1. A drive screw assembly comprising:
    a drive shaft having a drive shaft bore defined by an inner surface having a threaded portion, said drive shaft being disposed within a housing having an outer opening connected to said drive shaft bore, said drive shaft having a longitudinal axis, said drive shaft being free to rotate;
    a drive screw disposed within said drive shaft bore, said drive screw having a threaded portion, wherein said threaded portion of said drive shaft and said threaded portion of said drive screw are configured to receive one another in a threaded connection and to rotate with respect to one another about said longitudinal axis;
    a guide collar fixed relative to said housing, said guide collar having a guide bore with an inner support surface, wherein said inner support surface has an inner support surface length, wherein said inner support surface is connected to an outer surface of said guide collar by an inner guide bore opening and an outer guide bore opening; and
    a screw head affixed to said threaded portion of said drive screw, wherein said screw head is fixed in angular relation to said guide collar, and moveable along a range from a first position to a second position on a range axis that is parallel to said longitudinal axis of said drive screw;
    wherein said inner support surface of said guide collar supports a supported surface of said screw head or said drive screw in directions normal to said range axis as said screw head moves through said range, wherein said supported surface slides in linear motion relative to said guide collar without substantial rotational motion and without producing substantial frictional losses due to rotational motion as said screw head moves through said range, and wherein said guide collar includes an extension sleeve that is disposed within a portion of said drive shaft bore.

2. The drive screw assembly of claim 1, further comprising one or more bearings disposed within said housing and connected to said drive shaft, wherein said one or more bearings support said drive shaft for rotational motion.

3. The drive screw assembly of claim 2, wherein said drive shaft has first and second ends, and wherein said one or more bearings comprise first and second bearings disposed at first and second ends of said drive shaft.

4. The drive screw assembly of claim 1, wherein said threaded portion of said drive shaft comprises female threads and said threaded portion of said drive screw comprises male threads corresponding to said female threads.

5. The drive screw assembly of claim 1, wherein said threaded portion has an effective diameter that is less than a diameter of a non-threaded portion of said inner surface.

6. The drive screw assembly of claim 1, wherein said guide collar is rigidly connected to said first housing.

7. The drive screw assembly of claim 1, further comprising a machine element connected to said screw head.

8. The drive screw assembly of claim 7, wherein said machine element comprises a drag link pivotally connected to said screw head.

9. The drive screw assembly of claim 1, wherein said inner guide bore opening and said outer guide bore opening are concentric with said housing outer opening.

10. The drive screw assembly of claim 1, wherein said supported surface comprises said screw head perimeter.

11. The drive screw assembly of claim 1, wherein said supported surface comprises a circumferential surface of a screw shank.

12. The drive screw assembly of claim 1, wherein said guide collar includes a round cross section along said guide bore.

13. The drive screw assembly of claim 1, wherein said guide collar includes a square cross section along said guide bore.

14. The drive screw assembly of claim 1, wherein the range from the first position to the second position is disposed within the portion of said drive shaft bore, wherein the screw head, while moving along the range from the first position to the second position, is disposed within the guide bore, and wherein the guide collar is constructed and arranged to receive substantially no frictional forces due to an attempted rotation of the drive screw.

15. An electromechanical actuator (EMA) comprising:
    a drive shaft having a drive shaft bore defined by an inner surface having a threaded portion, said drive shaft being disposed within a housing having an outer opening connected to said drive shaft bore, said drive shaft having a longitudinal axis, said drive shaft being free to rotate;
    a drive screw disposed within said drive shaft bore, said drive screw having a threaded portion, wherein said threaded portion of said drive shaft and said threaded portion of said drive screw are configured to receive one another in a threaded connection and to rotate with respect to one another about said longitudinal axis;
    a guide collar fixed relative to said housing, said guide collar having a guide bore with an inner support surface, wherein said inner support surface length, wherein said inner support surface is connected to an outer surface of said guide collar by an inner guide bore opening and an outer guide bore opening;
    a screw head affixed to said threaded portion of said drive screw, wherein said screw head is fixed in angular relation to guide collar, and moveable along a range from a first position to a second position on a range axis that is parallel to said longitudinal axis of said drive screw; and
    an electric motor coupled to said drive shaft, wherein said electric motor is operable to rotate said drive shaft;
    wherein said drive screw head moves along said range in response to rotation of said drive shaft by said electric motor, and wherein said inner support surface supports a supported surface of said screw head or said drive screw in directions normal to said range axis as said screw head moves through said range, wherein said screw head slides in linear motion relative to said guide collar without substantial rotational motion and without producing substantial frictional losses due to rotational motion as said screw head moves through said range, and wherein said guide collar includes an extension sleeve that is disposed within a portion of said drive shaft bore.

16. The EMA of claim 15, further comprising one or more bearings disposed within said housing and connected to said drive shaft, wherein said one or more bearings support said drive shaft for rotational motion.

17. The EMA of claim 16, wherein said drive shaft has first and second ends, and wherein said one or more bearings comprise first and second bearings disposed at first and second ends of said drive shaft.

18. The EMA of claim 15, wherein said threaded portion of said drive shaft comprises female threads and said threaded portion of said drive screw comprises male threads corresponding to said female threads.

19. The EMA of claim 15, wherein said threaded portion has an effective diameter that is less than a diameter of a non-threaded portion of said inner surface.

20. The EMA of claim 15, wherein said guide collar is rigidly connected to said first housing.

21. The EMA of claim 15, further comprising a machine element connected to said screw head.

22. The EMA of claim 21, wherein said machine element comprises a drag link pivotally connected to said screw head.

23. The EMA of claim 15, wherein said inner guide bore opening and said outer guide bore opening are concentric with said housing outer opening.

24. The EMA of claim 15, wherein said guide collar inner support surface supports said screw head perimeter as said screw head moves along said range.

25. The EMA of claim 15, wherein said guide collar includes a round cross section along said guide bore.

26. The EMA of claim 15, wherein said guide collar includes a square cross section along said guide bore.

27. The EMA of claim 15, wherein motor is a brushless DC motor.

28. The EMA of claim 15, wherein the range from the first position to the second position is disposed within the portion of said drive shaft bore, wherein the screw head, while moving along the range from the first position to the second position, is disposed within the guide bore, and wherein the guide collar is constructed and arranged to receive substantially no frictional forces due to an attempted rotation of the drive screw.

* * * * *